United States Patent Office 3,435,006
Patented Mar. 25, 1969

3,435,006
COPOLYACETALS AND PROCESS FOR THEIR MANUFACTURE
Klaus Weissermel, Kelkheim, Taunus, Edgar Fischer, Frankfurt am Main, and Claus Schott, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Aug. 17, 1966, Ser. No. 572,893
Claims priority, application Germany, Sept. 8, 1965, F 47,118
Int. Cl. C08g 1/14
U.S. Cl. 260—67       2 Claims

ABSTRACT OF THE DISCLOSURE

Copolymers of trioxane, cyclic ethers and bis(epoxyethyl)benzenes are disclosed. The polymers may be prepared by copolymerizing mixtures of 98 to 89% by weight of trioxane, 2 to 10% by weight of cyclic ether and 0.05 to 2% by weight of bis(epoxyethyl)benzene in the presence of a cationic catalyst at a temperature of −50° to 100° C. The polymers are characterized by improved ball indentation, hardness and are especially useful as bearing materials and other objects which are exposed to high mechanical stress such as, for example, the highly stressed parts of weaving looms.

---

The present invention relates to copolymers obtained from trioxane, cyclic ethers and bisepoxyethylbenzene, and a process for making them.

It has already been described that high molecular weight polymers with recurring oxymethylene units can be prepared by polymerizing formaldehyde or by polymerizing trioxane. It has also been described that thermally stable polyacetals can be prepared by copolymerizing trioxane with saturated cyclic ethers, for example glycol formal or ethylene oxide. Products of this type are preferably used in the field of injection molding. It has, furthermore, been described to prepare copolymers of trioxane, cyclic ethers and compounds having two polymerizable groups.

Now we have found that copolymers of trioxane, cyclic ethers and bisepoxyethylbenzene can be prepared advantageously by polymerizing mixtures of 98 to 89 percent by weight of trioxane, 2 to 10 percent by weight of a cyclic ether and 0.05 to 2 percent by weight of bisepoxyethylbenzene.

By the term "cyclic ethers" there are to be understood, for example, compounds of the formula

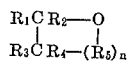

wherein $R_1$ to $R_4$ represent H or alkyl radicals or halogen-substituted alkyl radicals, $R_5$ represents a methylene- or an oxymethylene radical or an alkyl- or a halogen-alkyl-substituted methylene radical or an alkyl- or a halogen-alkyl-substituted oxymethylene radical, $n$ being a whole number from 0 to 3, or $R_5$ is equal to

$n$ being the whole number 1 and $m$ being a whole number from 1 to 3.

The aforesaid alkyl radicals contain 1 to 5 carbon atoms and may be substituted by 0 to 3 halogen atoms, preferably chlorine atoms. As cyclic ethers there may be used with special advantage ethylene oxide, glycol formal and diglycol formal. There may also be used, for example, propylene oxide, epichlorhydrin and 4-chloromethyl dioxolane.

As bisepoxyethylbenzenes there may be used ortho-, meta- and para-bisepoxyethylbenzene, preferably mixtures of 60 to 80 percent by weight of meta-bisepoxyethylbenzene and 40 to 20 percent by weight of para-bisepoxyethylbenzene.

The copolymers are distinguished especially by their outstanding properties as bearing material, which also manifests itself by their improved ball indentation hardness.

Polymerization may be carried out by conventional processes, i.e. in bulk, in solution or in suspension. As solvents there may preferably be used inert aliphatic and aromatic hydrocarbons, halohydrocarbons or ethers. Bulk polymerization proceeds in an especially smooth manner. Polymerization may be carried out at temperatures within the range of from −50° to +100° C., depending on the solvent used.

Polymerization is initiated by known cationically active catalysts. Suitable catalysts are, for example, inorganic and organic acids, acid halides and especially Lewis acids (cf. Kortüm, "Lehrbuch der Elektrochemie," Wiesbaden 1948, pp. 300 and 301). Of the latter, boron fluorides and their complexes, for example boron trifluoride etherates, may be used with special advantage. Especially suitable are the diazonium fluoborates which have been described in Belgian Patents 593,648 and 618,213 as well as the compounds known from Belgian Patent 585,980. The concentration of the catalysts may vary within wide limits. It is determined by the type of catalyst used and the molecular weight which the polymer should have. The concentration of the catalysts may be within the range of from 0.0001 to 1 percent by weight, calculated on the monomer mixture; it is most advantageous to use of from 0.001 to 0.1 percent by weight of the catalyst. Since the catalysts tend to decompose the polymer, it is recommended to render them inactive directly after the polymerization is complete, for example by ammonia or amino solutions.

Unstable semi-acetal terminal groups can be eliminated in known manner as is the case with other copolymers; it is advantageous to suspend the polymer in aqueous ammonia at temperatures within the range of from 100° to 200° C., in which case there may also be present a swelling agent such as methanol or n-propanol, or dissolve the polymer in a medium having an alkaline reaction at temperatures above 100° C. with subsequent reprecipitation. Examples of suitable solvents are benzyl alcohol, ethylene glycol monoethyl ether or a mixture of 60 percent methanol and 40 percent water, as alkaline-reacting compounds there may be used ammonia and aliphatic amines.

The polymers may be stabilized against the action of heat, light and oxygen in the same manner as is the case with the known trioxane co- and terpolymers. As heat stabilizers there may be used, for example, polyamides, amides of polybasic carboxylic acids, amidines and urea compounds, as oxidation stabilizers phenols, especially bisphenols and aromatic amines. α-Oxybenzophenone derivatives may be used as light-stabilizers.

The copolymers may be used with special advantage for the injection molding of bearings and objects which are exposed to high mechanical stress such, for example, as highly stressed parts of weaving looms, but also for extrusion molding as well as the manufacture of sheets, films and fibers.

The following example serves to illustrate the invention, but it is not intended to limit it thereto:

Example 100 grams trioxane, 2 grams ethylene oxide, 0.1 gram of a mixture of meta- and para-bisepoxyethylbenzene were polymerized in a screw-top glass bottle with 15 milligrams of para-nitrophenyl diazonium fluoborate as catalyst at a thermostat temperature of 70° C. After the polymerization was complete, the block was comminuted and ground and then hydrolized in a homogeneous phase at 150° C. for half an hour in 1 liter of benzyl alcohol in the presence of 10 cc. triethanolamine. After the hydrolysis, the copolymer was boiled with methanol, washed and dried. The ball indentation hardness of the plastic material obtained in this manner was 1400 kp./cm.² (German Industrial Standards (DIN) 7705).

Comparative example 100 grams trioxane, 2 grams ethyene oxide and 0.1 gram glycol diglycidyl ether were polymerized with 15 mg. para-nitrophenyl diazonium fluoborate and worked up, as described in the above example. The ball indentation hardness of this plastic material was 1320 kg./cm.².

We claim:

1. A process for the manufacture of copolyacetals which comprises polymerizing in the presence of a cationic catalyst at a temperature of −50° to 150° C. a mixture of 98 to 89% by weight of trioxane, 2 to 10% by weight of a cyclic ether of the formula

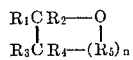

wherein $R_1$, $R_2$, $R_3$ and $R_4$ are hydrogen, an alkyl radical or a haloalkyl radical, $n$ is 0 to 3 and $R_5$ is a methylene, oxymethylene, alkylmethylene, haloalkylmethylene, alkyloxymethylene, haloalkyloxymethylene or

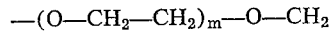

radical, $n$ being 1 and $m$ being 1 to 3 when $R_5$ is

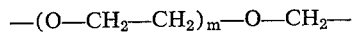

and 0.05 to 2% by weight of bis(epoxyethyl)benzene.

2. A copolymer essentially composed of units derived from 98 to 89% by weight of trioxane, 2 to 10% by weight of a cyclic ether having the formula

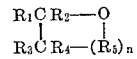

wherein $R_1$, $R_2$, $R_3$ and $R_4$ are hydrogen, an alkyl radical or a haloalkyl radical, $n$ is 0 to 3 and $R_5$ is a methylene, oxymethylene, alkylmethylene, haloalkylmethylene, alkyloxymethylene, haloalkyloxymethylene or

—(O—CH₂CH₂)ₘ—O—CH₂— radical, $n$ being 1 and $m$ being 1 to 3 when $R_5$ is

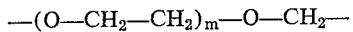

and 0.05 to 2% by weight of bis(epoxyethyl)benzene.

References Cited

UNITED STATES PATENTS 3,293,219   12/1966   Gottesman et al. _____ 260—67

FOREIGN PATENTS 971,915   10/1964   Great Britain.

OTHER REFERENCES

Chemical Abstracts, vol. 55, 15449i (August 1961).

F. D. ANDERSON, *Acting Primary Examiner.*

L. M. PHYNES, *Assistant Examiner.*

U.S. Cl. X.R.

260—2, 45.8, 45.85, 45.9, 45.95, 33.4, 33.2, 29.2